UNITED STATES PATENT OFFICE.

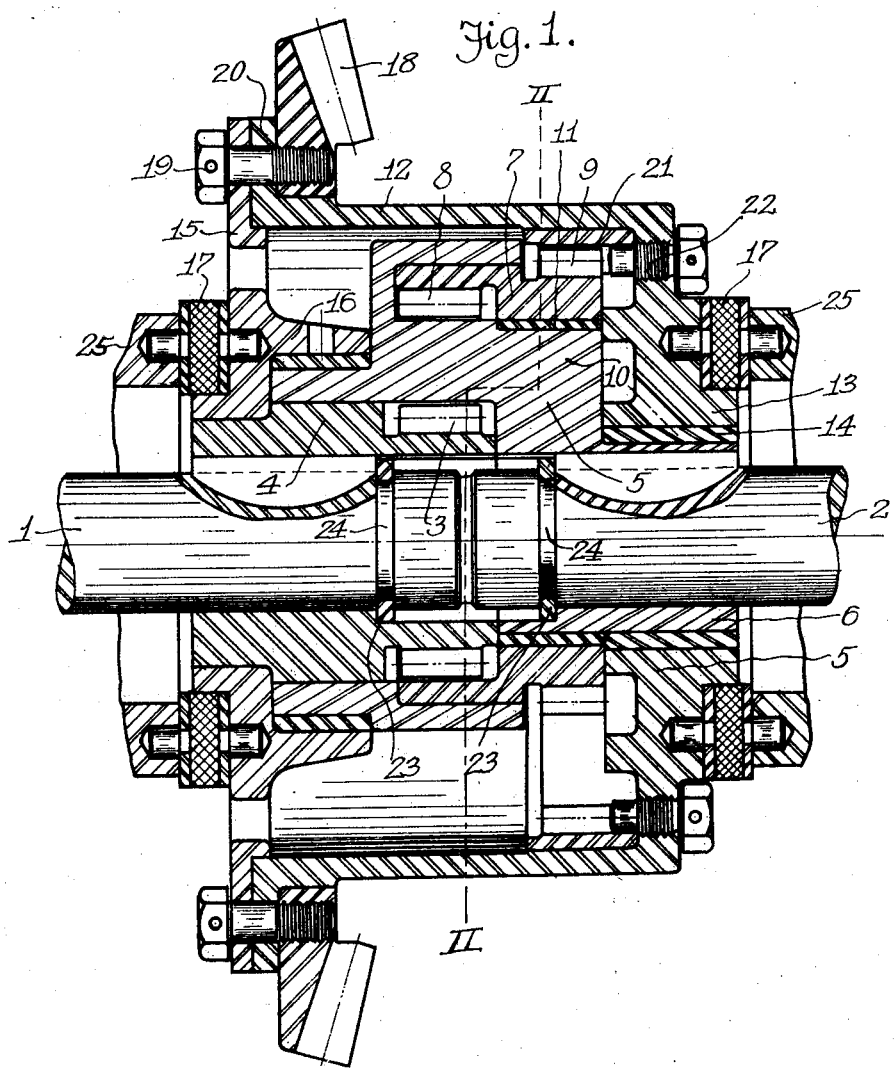

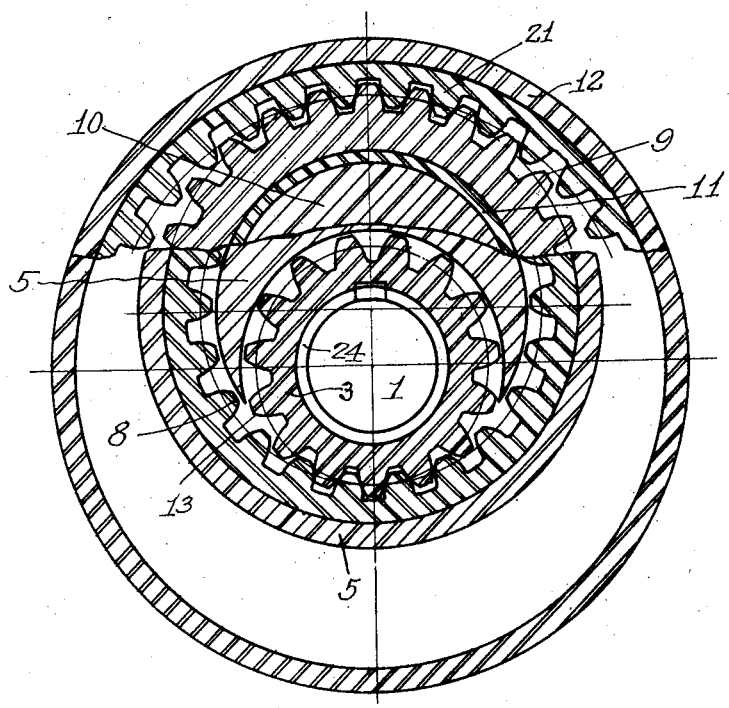

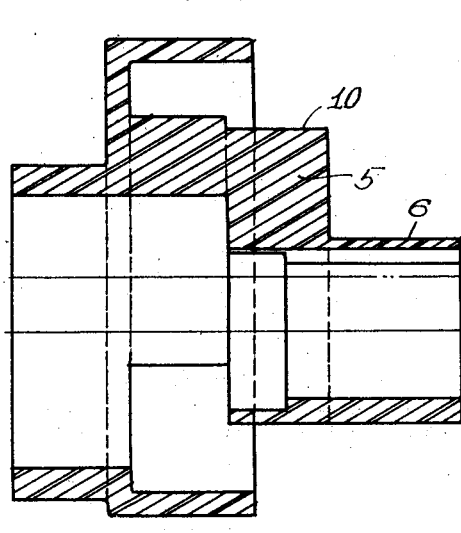
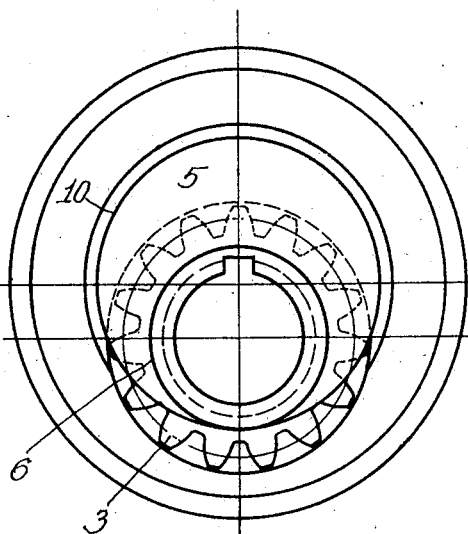

FRANK V. ELBERTZ, OF DETROIT, MICHIGAN, ASSIGNOR TO B. F. EVERITT COMPANY, OF DETROIT, MICHIGAN, A CORPORATION OF MICHIGAN.

DIFFERENTIAL MECHANISM.

1,405,986.     Specification of Letters Patent.     Patented Feb. 7, 1922.

Application filed January 22, 1919. Serial No. 272,442.

*To all whom it may concern:*

Be it known that I, FRANK V. ELBERTZ, a citizen of the United States of America, residing at Detroit, in the county of Wayne and State of Michigan, have invented certain new and useful Improvements in Differential Mechanism, of which the following is a specification, reference being had therein to the accompanying drawings.

This invention relates to a differential mechanism particularly adapted for light automobiles to provide the necessary compensating movement in the drive shafts of the axle thereof, the mechanism being so arranged as to minimize all parts, to equalize the thrust on the bearings and to combine rigidity with certainty of action and minimum difficulty of assembly.

The invention consists in the matters hereinafter set forth, and more particularly pointed out in the appended claims.

In the drawings,

Figure 1 is a view in longitudinal section, with parts shown in elevation, of a mechanism that embodies features of the invention;

Fig. 2 is a view in section through the mechanism, taken on or about line II—II of Fig. 1;

Fig. 3 is a view in longitudinal section and in detail of an eccentric driving member and bearing for a compound gear, and Fig. 4 is an end view of the bearing showing a driving pinion in place therein.

As herein shown a pair of alined shaft sections 1 and 2 are adapted to be journaled appropriately in an axle housing having the usual tubular arms. A driving pinion 3 is keyed or otherwise made fast to the section 1, and is provided with an enlarged journal portion 4. A driving member 5 has the hub 6 thereof keyed or otherwise made fast to the other shaft section 2 and extends over and is rotatable on the journal 4 of the pinion 3. An eccentric bearing recess is formed in this bearing member so that the teeth of the pinion 3 project into the same through the crescent shaped opening between the eccentric recess and the main bearing portion in which the journal portion of the pinion 3 lies. A compound annular gear 7 is journaled in the eccentric recess with internal teeth 8 meshing with the pinion 3 while the other portion of the gear having external teeth 9 is journaled on a barrel portion 10 of the driving member, a bushing 11 being interposed if desired.

A differential gear casing 12 has one end bearing 13 journaled on the extended hub of the driving member 5, a bushing 14 being introduced if desired. A removable head 15 at the other end of the casing has a bearing boss 16 which is sleeved on the other hub portion of the driving bearing member 5. End thrust rings 17 confine the casing between the portions 25 of the axle housing. Any means may be used to rotate the casing, a beveled gear 18 being herein indicated that is secured by studs 19 which hold the head 15 in place and pass through a flange 20 into engagement with the gear.

An internal annular gear 21 is non-rotatably secured in the casing 12 concentric with a shaft axis and in mesh with the external teeth 9 of the compound gear 7. As an easy method of interlocking the gear 21 and casing 12, studs 22 are used that are screwthreaded through the casing head and engage with the teeth of the gear. Thrust rings 23 engaging shoulders in the pinion 3 and driven member 5 and peripheral grooves 24 in the shaft sections 1 and 2 prevent longitudinal displacement of the latter.

In operation, if the loads on the shafts 1 and 2 are substantially equal, rotation of the casing drives the one through its eccentric bearing member and the other through the pinion which is keyed to it and interlocked with the compound annular gear, which under these circumstances does not tend to turn on its axis. If however, the shaft section 1, for example, tends to rotate faster than the casing speed, the shaft pinion causes the compound gear to rotate on the axis thereof and thereby travel ahead on the annular gear. If the shaft section 2 tends to rotate faster than the casing speed, the reversal of pressure of the eccentric on the compound gear permits the latter to rotate on its axis and travel ahead both on the casing and on the shaft pinion.

As a consequence a differential mechanism or compensating gear is obtained which is extremely simple in construction, readily machined and assembled and is positive in its driving action. It will be understood that the driving torque is transferred to the slower going section and it is found in practice that the proportion of the driving stress transmitted to the shaft sections is substantially proportional to the resistance which each encounters.

One feature of the device is the rigidity obtained by the double bearing of the eccentric member on both shafts.

Obviously, changes in the details of construction may be made without departing from the spirit of my invention and I do not care to limit myself to any particular form or arrangement of parts.

What I claim is:—

1. In a differential mechanism, a pair of axially alined differential shaft sections, a pinion secured to one section, a driving bearing member non-rotatably secured to the other shaft section with a bearing portion extending over the teeth of the pinion and journaled on the body thereof, a compound annular gear journaled in an eccentric recess of the driving bearing member having internal teeth in mesh with the shaft pinion, a driving casing journaled concentrically to the axis of the shafts on both the driving bearing member and the shaft pinion body, and an internal annular gear secured to the casing in mesh with external teeth on the compound annular gear.

2. In a differential mechanism, a pair of axially alined differential shaft sections, a driving bearing member non-rotatably secured to one shaft section and provided with an eccentric recess, a pinion non-rotatably secured to the other section extending into the eccentric recess, said pinion and said member having complemental formations to establish a journal relation therebetween in the assembly, a compound annular gear journaled in the eccentric recess with internal teeth in mesh with the pinion, an internal gear concentric with the sections in mesh with external teeth of the annular gear, and a driving member to which the internal gear is non-rotatably secured and in which the shaft sections are rotatable.

3. In a differential mechanism, a pair of axially alined differential shaft sections, a driving bearing member non-rotatably secured to one section and provided with an eccentric bearing recess, a pinion non-rotatably secured to the other section with the toothed portion thereof extending into the recess and a body forming a bearing on which the driving member is journaled, a compound annular gear having an external bearing in the recess and an internal bearing on the body of the driving member with internal teeth in mesh with the pinion, a driving casing concentrically rotatable to the sections, and an internal gear secured to the casing in mesh with the external teeth of the compound gear.

4. In a differential mechanism, a pair of axially alined differential shaft sections, a pinion secured to one section, a driving bearing member non-rotatably secured to the other section and provided with a counterbored hub journaled on the body of the pinion and with an eccentric bearing recess into which the pinion extends, a compound gear having an external bearing in the recess and an internal bearing on the body of the driving member with internal teeth in mesh with the pinion within the recess and external teeth concentric with the other bearing portion of the gear, a casing journaled on the pinion and bearing member, an internal gear secured in the casing concentrically with the shaft in mesh with the external teeth of the compound gear, and a driving gear mounted on the casing.

5. In a differential mechanism, a pair of axially alined differential shaft sections, a driving bearing member non-rotatably secured to one section and provided with an eccentric bearing portion having an internal bearing face and an external bearing face, a compound gear journaled against both faces with internal teeth in mesh with the section pinion and with external teeth, an internal gear in mesh with the external teeth of the compound gear, and a casing journaled concentrically with the shafts that carries the internal gear.

6. In a differential mechanism, a pair of axially alined shaft sections, a pinion secured to one section with a bearing body of greater diameter than the tooth portion, a bearing driving member secured to the other shaft section with a counterbored hub journaled on the bearing body of the pinion, and an eccentric recess into which the tooth portion of the pinion extends, a compound annular gear journaled in the eccentric recess with internal teeth in mesh with the pinion and with external teeth exterior of the recess, an internal annular gear in mesh with the external teeth of the compound gear, and a driving casing journaled concentrically with the shaft sections in which the internal gear is secured.

7. In a differential mechanism, a pair of axially alined differential shaft sections, a pinion secured to one section, a driving bearing member non-rotatably secured to the other section and provided with an eccentric recess into which the pinion extends, said pinion and said member having complemental formations to establish a journal relation therebetween in the assembly, a compound annular gear having an internal tooth portion offset from an external tooth portion with the internal tooth portion journaled in the eccentric recess in mesh with the pinion, an internal annular gear in mesh with the external tooth portion, and a casing rotatable concentrically with the sections, in which the internal annular gear is mounted.

8. In a differential mechanism, a pair of axially alined differential shaft sections, a pinion secured to one section, a driving bearing member non-rotatably secured to the other section with a bearing portion extending over the teeth of the pinion and rotating on the body of the latter and having an eccentric recess into which the tooth portion of the pinion extends, a compound gear journaled in the eccentric portion of the bearing member having internal teeth in mesh with the pinion, a driving casing rotatable concentrically with the sections, an internal annular gear in the casing in mesh with the external teeth of the compound gear, and studs extending through the casing and interlocking with the teeth of the internal gear.

9. In a differential mechanism, a pair of axially alined differential shaft sections, housings for the shaft sections with end thrust bearing faces in spaced relation, a pinion secured to one section, a driving bearing member non-rotatably secured to the other section and journaled on the pinion, a compound annular gear journaled eccentrically on the driving member with internal teeth in mesh with the pinion, a driving casing journaled concentrically on the pinion and a bearing member between the housings having end thrust bearing against the latter and opposed end thrust bearings against the pinion and driving member, and an internal gear carried by the casing in mesh with external teeth of the compound gear.

In testimony whereof I affix my signature in the presence of two witnesses.

FRANK V. ELBERTZ.

Witnesses:
O. F. BARTHEL,
ANNA M. DORR.